(12) United States Patent
Boessneck et al.

(10) Patent No.: US 6,408,654 B1
(45) Date of Patent: Jun. 25, 2002

(54) FILAMENT FORMING APPARATUS AND A COOLING APPARATUS FOR AND METHOD OF INDUCING A UNIFORM AIR FLOW BETWEEN A FILAMENT FORMING AREA AND THE COOLING APPARATUS

(75) Inventors: Douglas Scott Boessneck, Westerville; Guang Gao; David Herman Wolf, both of Newark; Andrew Lawrence Snedden, Mt. Perry; Patrick John Prescott, Newark; Seshadri Srinivasan, Worthington; Jeffrey Coon, Newark, all of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/329,144

(22) Filed: Jun. 9, 1999

(51) Int. Cl.[7] ............................................. C03B 37/02
(52) U.S. Cl. .......................... 65/434; 65/481; 65/498; 65/512
(58) Field of Search ..................... 65/434, 481, 498, 65/510, 511, 512, 513

(56) References Cited

U.S. PATENT DOCUMENTS

| | | |
|---|---|---|
| 3,232,730 A | 2/1966 | Drummond |
| 3,256,078 A | 6/1966 | Drummond |
| 3,334,981 A * | 8/1967 | Glaser ......................... 65/498 |
| 3,345,147 A | 10/1967 | Russell |
| 3,695,858 A | 10/1972 | Russell |
| 3,775,074 A | 11/1973 | Russell |
| 3,829,301 A | 8/1974 | Russell |
| 3,849,101 A | 11/1974 | Wythe et al. |
| 4,055,406 A * | 10/1977 | Slonaker et al. ............... 65/498 |
| 4,088,469 A | 5/1978 | Schaefer |
| 4,140,506 A * | 2/1979 | Machlan ....................... 65/471 |
| 4,146,373 A | 3/1979 | Sullivan et al. |
| 4,197,103 A | 4/1980 | Ishikawa et al. |
| 4,310,602 A * | 1/1982 | Martin, Jr. ................... 428/596 |
| 4,330,311 A | 5/1982 | Jensen |
| 4,332,602 A | 6/1982 | Jensen |
| 4,352,687 A | 10/1982 | Boettner |
| 4,643,750 A | 2/1987 | Glaser |
| 4,657,573 A | 4/1987 | Jones |
| 4,659,357 A | 4/1987 | Doud |
| 4,662,922 A | 5/1987 | Hill et al. |
| 4,704,150 A | 11/1987 | McEarthron |
| 4,824,457 A | 4/1989 | Jensen |
| 5,244,483 A | 9/1993 | Brosch et al. |
| 5,377,491 A | 1/1995 | Schulte |
| 5,693,118 A | 12/1997 | Snedden et al. |
| 5,709,727 A | 1/1998 | Bobba |
| 5,846,285 A * | 12/1998 | Srinivasan et al. ........... 65/498 |

* cited by examiner

Primary Examiner—Sean Vincent
(74) Attorney, Agent, or Firm—Inger H. Eckert

(57) ABSTRACT

A filament forming apparatus and cooling apparatus for and method of inducing a uniform air flow between a filament forming area beneath a bushing and the cooling apparatus are disclosed. The cooling apparatus includes an air housing extending beneath the bushing. The air housing has a top wall and side walls defining an air chamber therebetween.

12 Claims, 8 Drawing Sheets

FILAMENT FORMING APPARATUS AND A COOLING APPARATUS FOR AND METHOD OF INDUCING A UNIFORM AIR FLOW BETWEEN A FILAMENT FORMING AREA AND THE COOLING APPARATUS

TECHNICAL FIELD AND INDUSTRIAL APPLICABILITY OF THE INVENTION

This invention relates generally to an apparatus for and method of producing continuous glass filaments, and in particular, to an apparatus having a bushing and a cooling apparatus positioned beneath the bushing to induce a uniform air flow between a filament forming area beneath the bushing and the cooling apparatus to cool the area. The invention is useful in the production of continuous glass filaments that may be used as reinforcement in molded resinous articles.

BACKGROUND OF THE INVENTION

In the manufacture of continuous glass filaments, glass is melted in a filament forming apparatus and flows to one or more bushings. Each bushing has a number of nozzles or tips through which streams of molten glass flow. The glass streams are mechanically pulled from the nozzles by a winding apparatus to form continuous glass filaments.

The temperature of the molten glass within the bushing must be high enough to maintain the glass in a liquid state. However, if the temperature is too high, the molten glass will not cool sufficiently so as to become viscous enough to form filaments after passing through the bushing tips. Thus, the glass must be quickly cooled or quenched after it flows from the bushing tips and forms glass filaments. If the glass cools too slowly, the glass filaments will break and the filament forming process will stop.

There are numerous apparatuses for cooling the glass filament forming area beneath a filament forming machine. Conventional cooling apparatuses use air, water, or both to transfer heat from the filament forming area beneath a bushing and cool the glass filaments.

Figure 1:
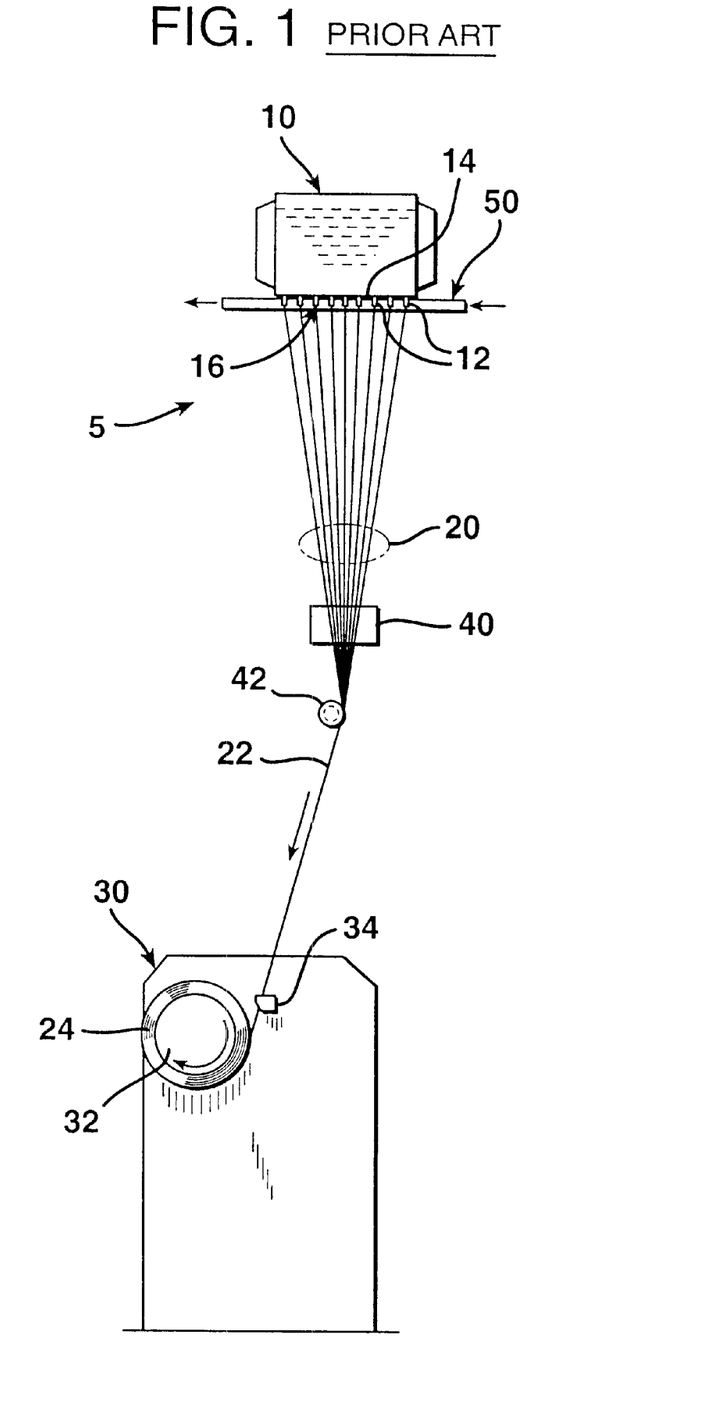
FIG. 1 is a schematic view of a conventional glass filament forming apparatus including a cooling apparatus.

A conventional glass filament forming apparatus 5 with a heat transfer apparatus 50 is shown in FIG. 1 and is disclosed in U.S. Pat. No. 4,662,922 to Hill et al. (Hill), the disclosure of which is expressly incorporated herein by reference. Filaments 20 are drawn from a plurality of nozzles 12 of a bushing 10 and gathered into a strand 22 by a roller 42. Size is applied to coat the filaments by a size applicator 40. A reciprocating device 34 guides strand 22, which is wound around a rotating collet 32 in a winding apparatus 30 to build a cylindrical package 24. The heat transfer apparatus 50 is located beneath a bottom plate 14 of the bushing 10 to cool filament forming area 16 beneath the bushing 10.

Figure 2:
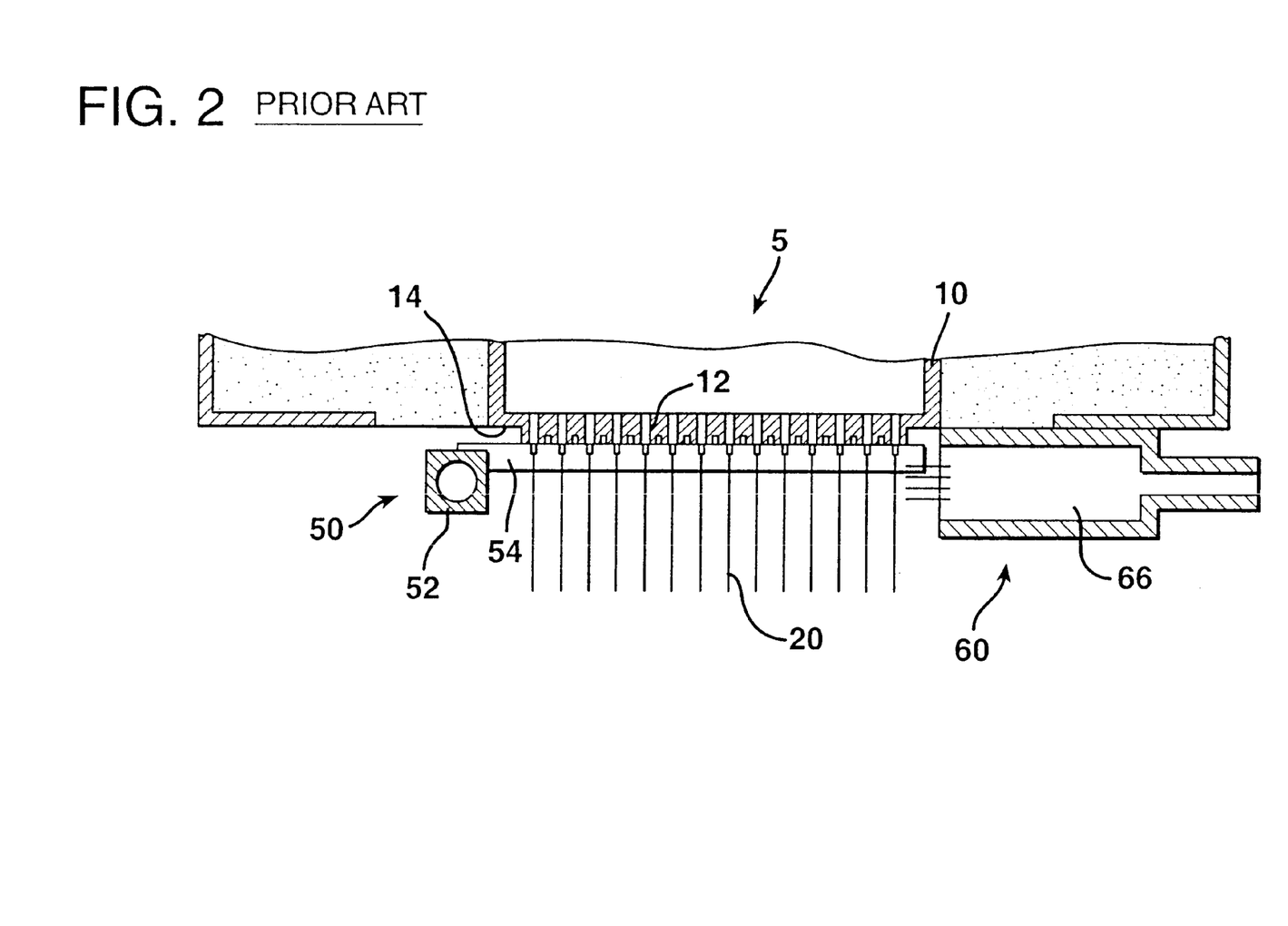
FIG. 2 is a schematic side view of another conventional glass filament forming apparatus including a cooling apparatus.

Another conventional filament forming apparatus is shown in FIG. 2 and is disclosed in U.S. Pat. No. 4,197,103 to Ishikawa et al. (Ishikawa). The forming apparatus in Ishikawa includes a cooling system that uses both air and a cooling fluid to cool the filament forming area 16.

The cooling system includes a heat transfer apparatus 50 with a manifold 52 and cooling fins 54 that extend from the manifold 52 between rows of nozzles 12. A cooling fluid flows through a channel formed in manifold 52. Heat from the glass is transferred to the fins both radiantly and, via the ambient air surrounding the fins and glass, convectively. Heat travels to the manifold 52 from cooling fins 54 conductively and is transferred to the cooling fluid convectively.

The cooling system also includes a cooling apparatus 60 with an air manifold 66. An air source, such as a pump, supplies air to the manifold 66 from which it is introduced on one side of the bushing 10. The air travels along the nozzles 12 and fins 54. The air is introduced during the initial start-up period of a filament forming operation. After the operation stabilizes (approximately 5 to 10 seconds after start-up), the air flow is reduced or terminated.

Cooling apparatus 60 introduces air from only one side of the bushing 10. The air quickly heats up as it flows along the fins 54 and through the filament forming area 16. As a result, an insufficient amount of heat is removed from the filament forming area and the risk of bushing breaks and shut downs of the filament forming process increases. Further, the short periods of air flow are insufficient to continuously cool the filament forming area and the filaments.

Figure 3A:
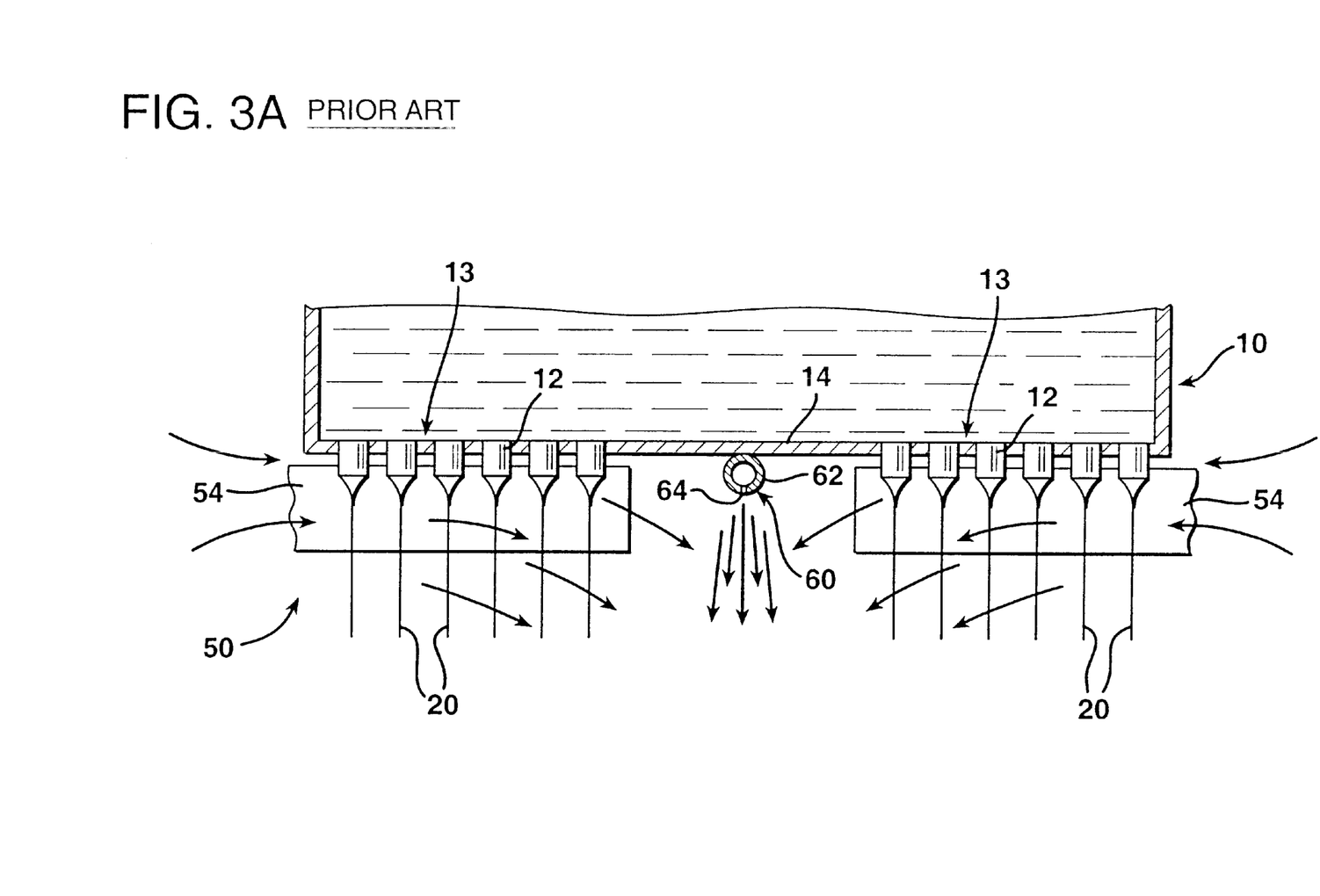
FIGS. 3A and 3B are schematic side views of the conventional cooling apparatus of the filament forming apparatus of FIG. 1.
Figure 3B:
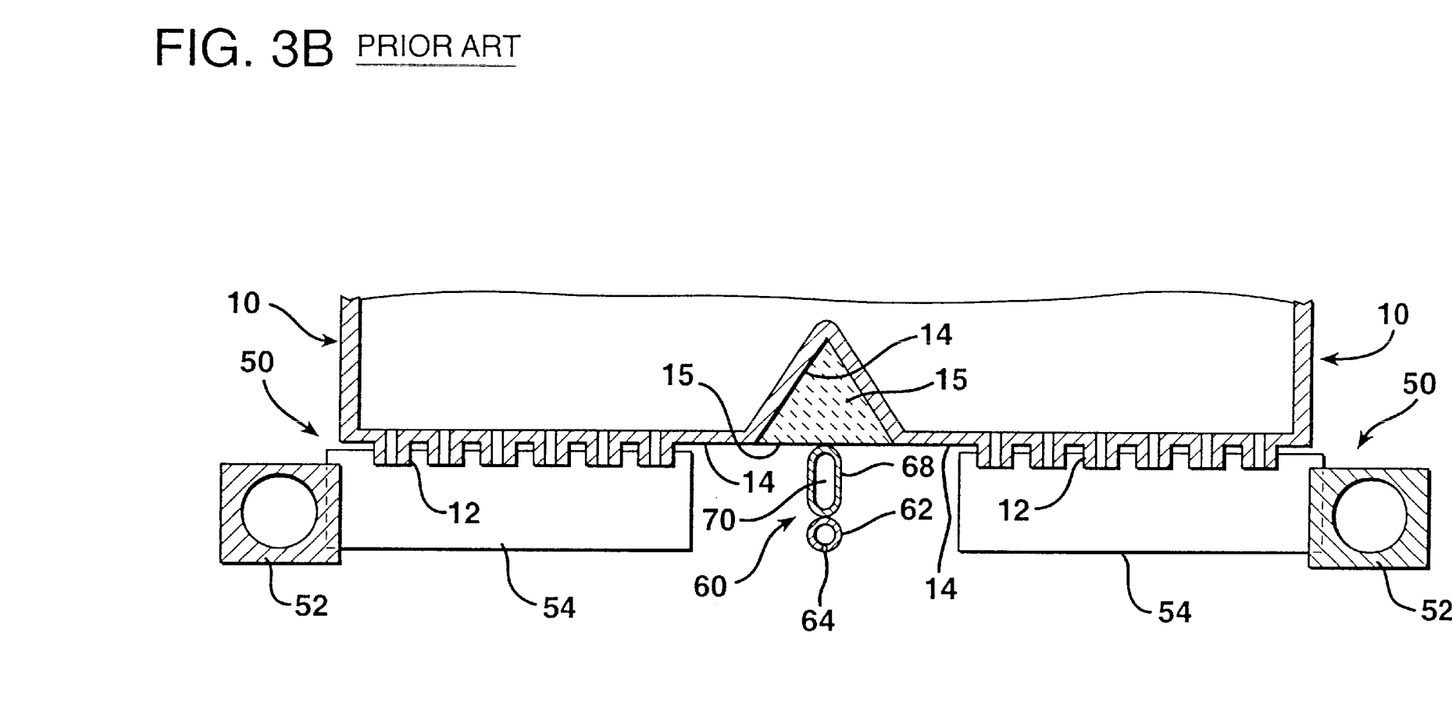

Additional conventional cooling systems disclosed in Hill are shown in FIGS. 3A and 3B. The cooling system shown in FIG. 3A includes a heat transfer apparatus 50 and a cooling apparatus 60. The heat transfer apparatus 50 includes a manifold and cooling fins 54 similar to Ishikawa.

The cooling apparatus 60 includes a tube 62 with several apertures 64 along its bottom surface. Air is supplied to a channel in tube 62 and flows through the apertures 64 to the area between banks 13 of bushing nozzles 12. The air from tube 62 is cooler than the air in the filament forming area 16. The air flow entrains and induces air from the sides of the bushing 10 along the cooling fins 54 and in a generally downward direction. The induced air flow also cools filament forming area 16.

In the cooling apparatus 60 shown in FIG. 3B, a cooling fluid tube 68 supports tube 62. Tube 68 has a passage 70 through which a cooling fluid, such as water, flows. The fluid is used in conjunction with air from tube 62 to remove heat and maintain the temperature of the filament forming area 16. In Hill, the amount of heat removed from the filament forming area is limited by the volume of air flow.

Another conventional cooling apparatus is disclosed in U.S. Pat. No. 4,612,027 to Marra (Marra). Marra discloses a glass filament forming apparatus with a cooling apparatus. Cooling apparatus 80 includes a manifold 82 having a plurality of nozzles 81 as shown in FIG. 1 of Marra. Nozzles 81 are adapted to direct streams of cooling air toward the streams of molten glass and bottom plate of the bushing 10.

Another conventional cooling apparatus is disclosed in U.S. Pat. No. 4,003,731 to Thompson (Thompson). Thompson discloses a filament forming apparatus having a nozzle 10 through which air is introduced toward the bottom plate of a bushing and the glass filaments attenuated therefrom. Nozzle 10 includes a chamber 12 with apertures 18 through which air flows into skirt 14 as shown in FIG. 3 of Thompson. The air from the nozzle prevents overheating and rapidly quenches the glass streams. However, Thompson teaches that the upward movement of the air from the nozzle serves to substantially eliminate the induction of air by the downwardly moving glass streams.

A conventional apparatus for cooling a filament forming area that uses a vacuum to draw warm air out of the area is disclosed in U.S. Pat. No. 5,693,118 to Snedden et al. (Snedden). In Snedden, hollow fins similar in shape to the conventional cooling fins are mounted to a manifold through which a vacuum is applied. Each fin includes a hollow chamber and apertures along its top wall through which warm air in the filament forming area is drawn by the vacuum.

Each filament forming apparatus has an "operating" condition and a "hanging" condition. In an "operating" condition, continuous filaments are attenuated from a bushing at high speeds. The attenuation of the filaments induces the air surrounding the filaments in the direction that the filaments are drawn. The flow of surrounding air induces air from the perimeter of the bushing into the interior of the filament forming area to help cool the molten glass.

A "hanging" condition occurs when some or all of the filaments are not drawn at production speed and molten glass slowly flows from a bushing. During this condition, minimal air flow is induced into the filament forming area, thereby decreasing the cooling of the filament forming area and the filaments.

The filament forming apparatus must be adequately cooled during the hanging condition to permit filament attenuation to quickly restart after a disruption. The failure to quickly restart reduces the operating efficiency of the apparatus and lowers the overall throughput.

If heat is more rapidly removed from a filament forming area, the operating temperatures of the bushing and the glass in the bushing can be raised to increase throughput. There is a need for a system that removes more heat from a filament forming area than conventional cooling systems. Also, there is a need for an improved apparatus for and method of providing a uniform air flow to a filament forming area beneath a bushing.

SUMMARY OF THE INVENTION

The disclosed filament forming apparatus and cooling apparatus for and method of inducing a uniform air flow between a filament forming area beneath a bushing and the cooling apparatus offers advantages over the prior art. The filament forming apparatus includes a bushing having two laterally spaced banks or sets of nozzles from which glass filaments are attenuated. The cooling apparatus includes an air housing extending longitudinally between the banks of tips. The air housing has a top wall and two perforated side walls defining an air chamber. Each perforated side wall is oriented at an angle with respect to a vertical plane and faces in a downward sloping direction. An air source supplies air to the air housing from which it flows through the side walls and toward the banks of bushing tips in the filament forming area. Openings in the side walls control the air flow from the air housing.

The cooling apparatus also includes an air plenum coupled to each end of the air housing. The air plenums are in communication with the air source and the air flows through the plenums and into the air chamber. Turning vanes are mounted at each intersection of the air housing and an air plenum to direct air into the air chamber. The cooling apparatus also includes a plurality of fluid cooled tubes in the air housing to control the temperature in the air chamber.

A reduction in temperature of the filaments and the filament forming area permits the filament forming apparatus to produce filaments with more uniform diameters and to increase the bushing operating temperature, thereby increasing throughput. The cooling apparatus delivers a more uniform air flow to the bushing tips than conventional systems. The cooling apparatus induces air flow to the banks of bushing tips from the within the interior regions of the bushing. The cooling apparatus reduces the number of bushing breaks and process shut downs.

Alternatively, each side wall may include an opening and a screen mounted in each opening. Alternatively, the air source may be replaced with a vacuum source and warm air in the filament forming area may be drawn from the filament forming apparatus into the air chamber by the vacuum source.

DETAILED DESCRIPTION AND PREFERRED EMBODIMENTS OF THE INVENTION

An apparatus for cooling the filament forming area beneath a bushing embodying the principles of the invention is illustrated in FIGS. 4–9. The disclosed cooling apparatus improves the forming process of glass filaments, particularly by inducing a uniform air flow between the filament forming area and the cooling apparatus, thereby permitting a higher operating temperature in the bushing and an increase in throughput. The cooling apparatus supplies air through an air housing toward the banks of bushing nozzles in the filament forming area.

A conventional glass filament forming apparatus with a cooling system is shown in FIG. 1. Glass filament forming apparatus 5 may be of any conventional design, such as that disclosed in Hill.

Figure 9:
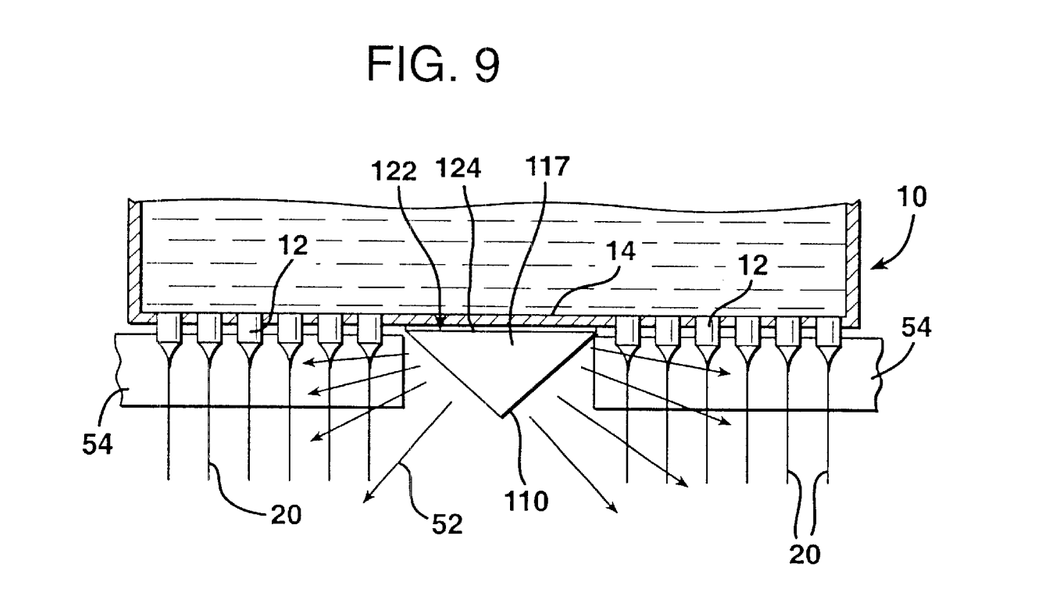
FIG. 9 is a cross-sectional side view showing the relationship between the bushing, the air housing, and glass filaments.

A cooling apparatus 100 embodying the principles of the invention is shown in FIGS. 4–8. Cooling apparatus 100 includes an air housing 110 and air plenums 130, 132 fluidically coupled to each end of the air housing 110. Air housing 110 and air plenums 130, 132 are sealed together by flanges (not shown). Air plenums 130, 132 have air tubes 170, 172 and 174, 176 fluidically coupled to each end, respectively. Cooling apparatus 100 is mounted in a filament forming area beneath a bushing, essentially as shown in FIG. 9.

Figure 5A:
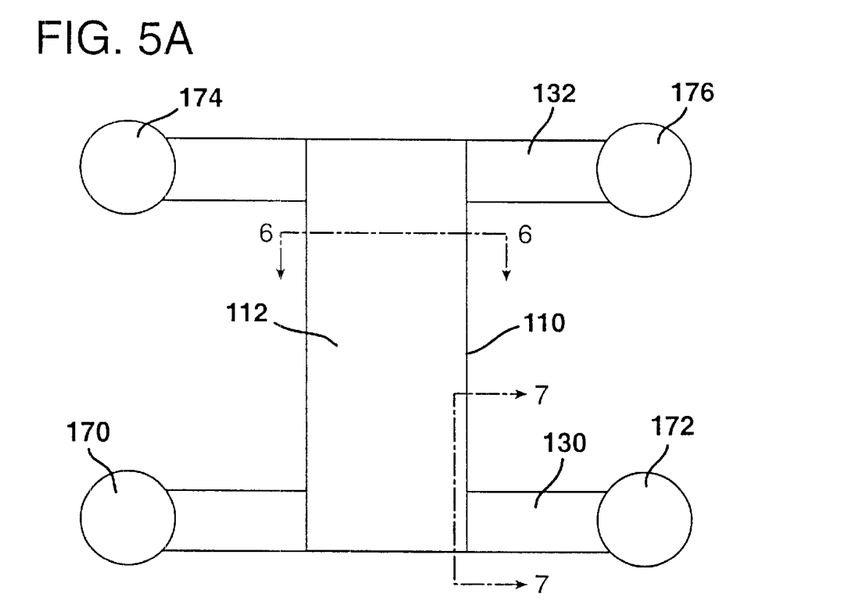
FIG. 5A is a top view of the cooling apparatus of FIG. 4.
Figure 5B:
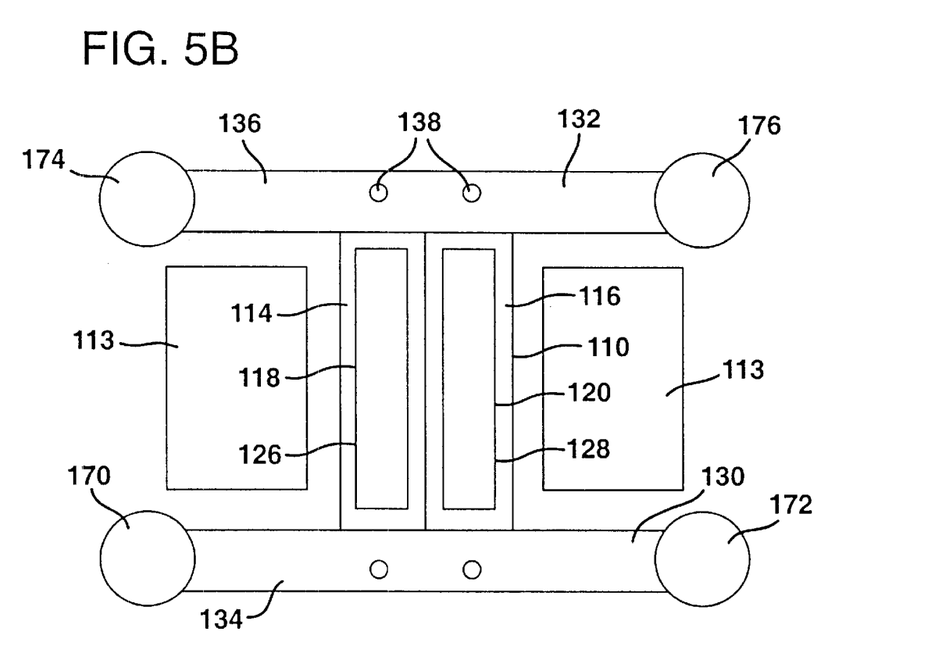
FIG. 5B is a bottom view of the cooling apparatus of FIG. 4 showing the relationship between the banks of bushing tips and the cooling apparatus.
Figure 6:
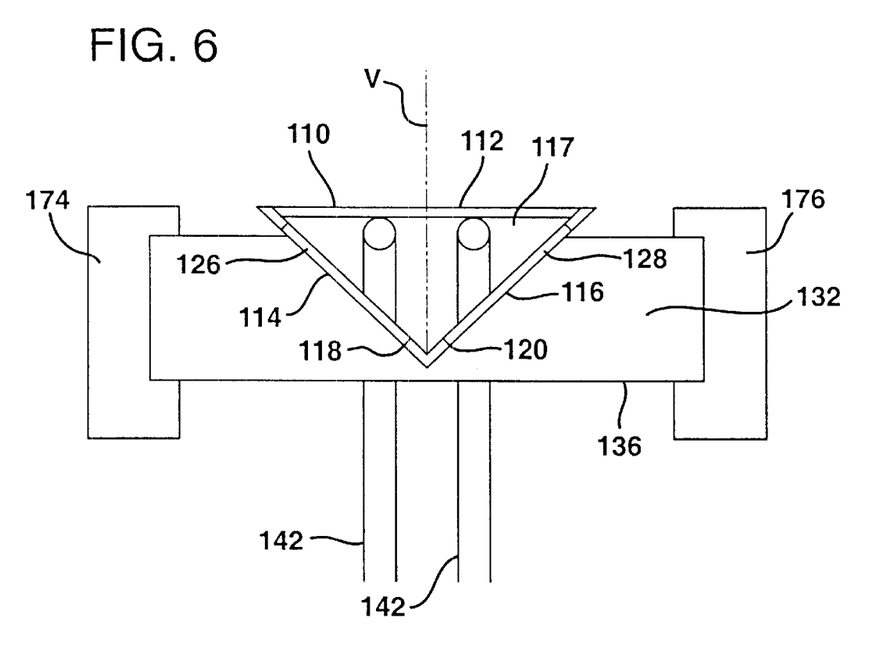
FIG. 6 is a cross-sectional side view of the cooling apparatus taken along the line "6—6" in FIG. 5A.

Air housing 110 has a top wall 112 and two perforated side walls 114, 116 as shown in FIGS. 5A–6. Top wall 112 is substantially horizontal and side walls 114, 116 are sloped downwardly toward a common line. Top wall 112 and perforated side walls 114, 116 define therebetween an air chamber 117. Each perforated side wall 114, 116 is oriented at an angle of approximately 43° with respect to a vertical plane "V" as shown in FIG. 6. The cross-sectional shape of air housing 110 is thus triangular.

Alternatively, each side wall 114, 116 could include a rectangular opening 118, 120. Each opening 118, 120 extends substantially the entire length of air housing 110. Air housing 110 includes screens 126, 128 mounted in openings 118, 120, respectively. The screens are releasably secured to the air housing 110 by fasteners (not shown), as appreciated by the artisan. Since the screens 126, 128 are mounted in the openings, they are oriented at the same angles as the side walls.

Figure 4:
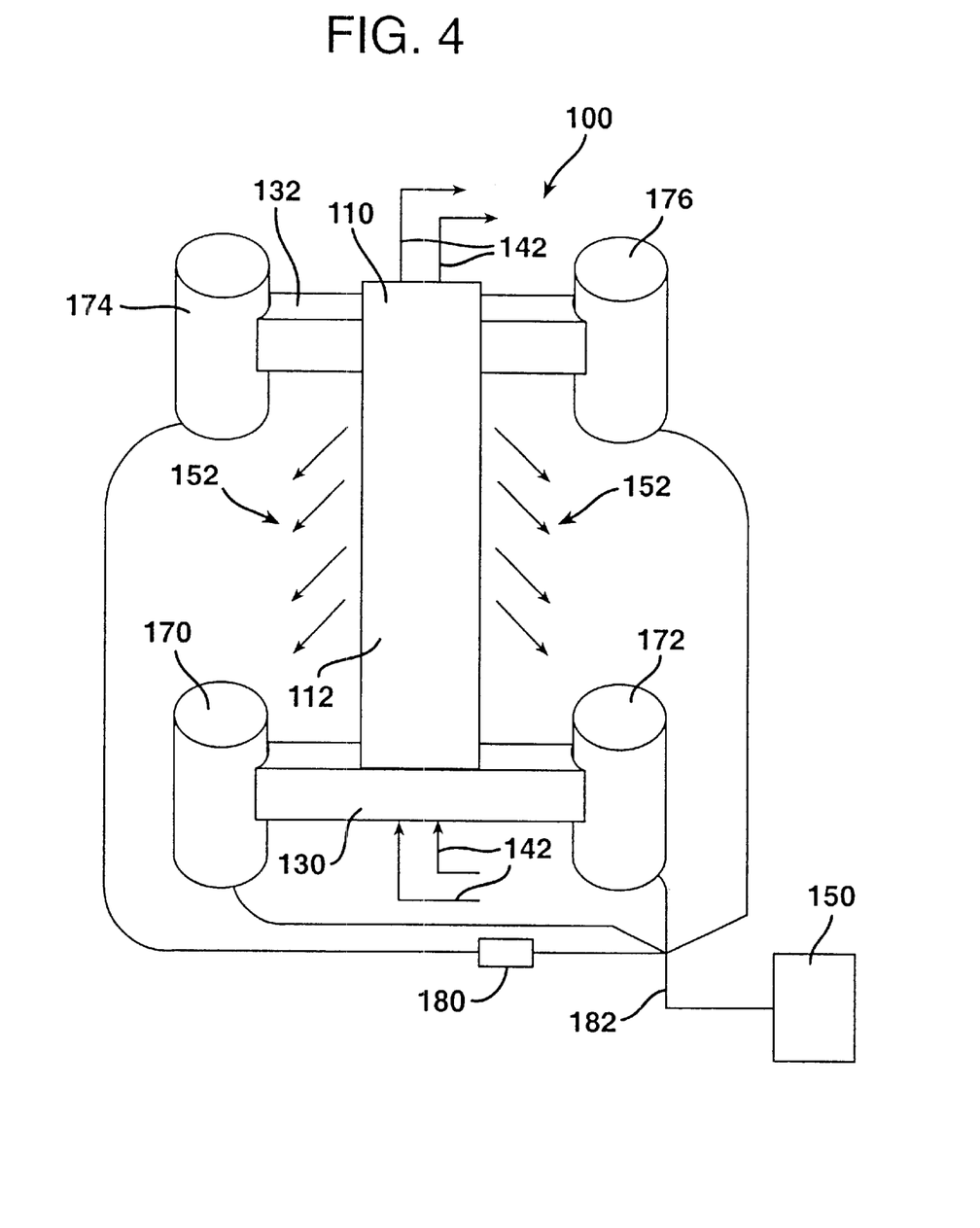
FIG. 4 is a schematic view of a cooling apparatus embodying the principles of the invention.

Cooling apparatus 100 also includes a header 182 in communication with air tubes 170, 172, 174, and 176. An air blower or source 150 is coupled to the header 182 and supplies air to air plenums 130, 132 via header 182 and the air tubes. A pressure gauge 180 is located in one of the air tubes to monitor the air pressure in the system.

Cooling apparatus 100 includes a plurality of turning vanes 140 mounted in the intersections of the air plenums 130, 132 with air housing 110. Turning vanes 140 direct air from the air plenums into the air chamber 117 of the air housing 110. The turning vanes 140 are shown relative to the air plenums and air housing in FIGS. 7 and 8.

Cooling apparatus 100 includes a plurality of cooling fluid tubes 142 that extend through the air housing 110. Water is supplied to the tubes 142 from a pump (not shown) to control the temperature inside the air chamber 117 as well as the top wall 112 to minimize oxidation and adverse thermal expansion which could cause the unit to bow upwardly. Tubes 142 enter air plenum 130, extend through air housing 110, and exit air plenum 132.

Figure 7:
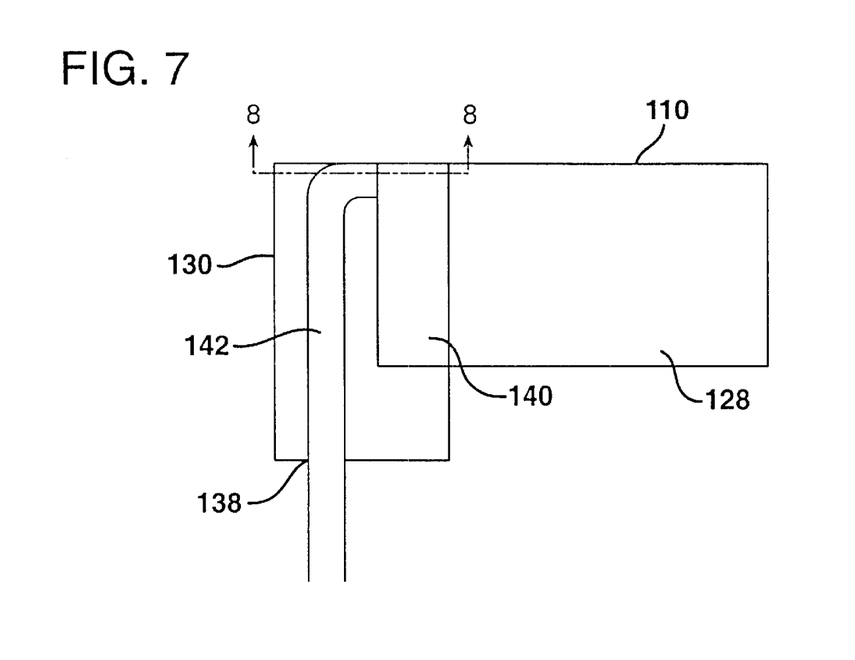
FIG. 7 is a cross-sectional side view of an air plenum and the air housing taken along the lines "7—7" in FIG. 5A.
Figure 8:
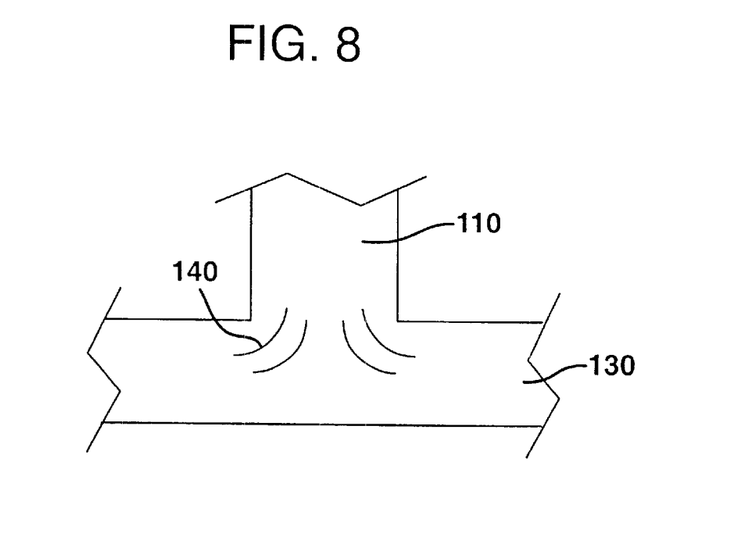
FIG. 8 is a cross-sectional top view of turning vanes taken along the lines "8—8" in FIG. 7.

Air plenums 130, 132 include bottom walls 134, 136 as shown in FIG. 5B. Each bottom wall 134, 136 includes holes 138 through which tubes 142 pass. Tubes 142 are mounted adjacent the top wall 112 of air housing 110. The location of the cooling fluid tubes 142 relative to the air plenum 130 and air housing 110 is shown in FIGS. 6 and 7.

The operation of the cooling apparatus will now be described with reference to FIGS. 4, 5B and 9. Cooling apparatus 100 is mounted between banks of bushing tips in the filament forming area as shown in FIG. 5B. Blower or pump 150 forces air, preferably at room temperature, through header 182 and into air tubes 170, 172, 174, and 176. The air is introduced from the air tubes into the air plenums 130, 132 and directed into the air housing 110 by turning vanes 140. Since the pressure of the air in air housing 110 is greater than that in the filament forming area, air 152 is forced outwardly through the openings in the perforated side walls 114, 116.

The perforated side walls 114, 116 and the screens 126, 128 preferably have between a 0.7 to 2.0% open area through which air can flow. The open area percentage provides a suitable resistance to air flow, resulting in a uniform air flow through both perforated side walls into the filament forming area. The resistance also reduces or eliminates the effect of any small pressure changes in the air flow upstream of the side walls. The perforated sheets or screens may be made of metal, such as stainless steel.

The direction of the air flow from air housing 110 to the filament forming area and nozzle banks 13 is shown in FIG. 9. The flow of air 152 forces air between the bushing banks 13 into the filament forming area and induces air from within the interior regions of the bushing into the filament forming area due to its downward directional component.

A cooling fluid flows through tubes 142 to control the temperature in the air chamber 117 as well as the top wall 112. To lower the temperature in the chamber, the operator may use a fluid cooler than room temperature.

Pressure gauge 180 monitors the system pressure. A rise in air pressure indicates that the air flow through one or more screens may be completely or partially blocked. When the air pressure reaches a high level, the operator may shut down the cooling apparatus and clean or replace the screens.

The top wall 112 of the air housing 110 also functions as a structural support for the tip plate or bottom plate of the bushing. The top wall 112 is thermally isolated from the bottom plate of the bushing by a layer of ceramic cloth 122 and castable refractory 124 as shown in FIG. 9 and as appreciated by the artisan.

The cooling apparatus of the present invention is used with a heat transfer apparatus with a manifold and cooling fins. The components of the cooling apparatus are preferably stainless steel.

Preferably, the velocity of the air flow entering or exiting a perforated plate or screen is in the range of 50 to 400 ft/min. (15.25 to 122 m/sec. +/−10–15% and the rate of air flow is in the range of 25 to 300 $ft^3$/min. As discussed above, the perforated side walls and the screens have an open area of 0.7 to 2.0%. Further, the length of the air housing is substantially the same as the length of the adjacent bushing and the thickness of the side walls and top wall is in the range of 0.02 to 0.06".

The artisan will also appreciate that there are many possible variations on the particular embodiment described above that would be consistent with the principles of the invention.

For example, the angle of orientation of the side walls of the air housing may be varied with respect to a vertical plane. Also, a plurality of screens may be mounted in each opening in the side walls. Further, each side wall may include a plurality of openings.

An alternative is that the air housing may have any geometric cross-sectional shape that permits air to uniformly flow into the filament forming area. For example, the air chamber may include a semi-circular lower portion coupled to the top wall instead of two angled side walls. In this case, each screen or perforated sheet would be appropriately shaped to match the opening or openings defined in the lower portion.

Another alternative is that the number of cooling tubes and the temperature of the cooling fluid flowing in each tube or an internally fluid cooled laminated top plate may be varied depending on the desired air temperature in the air chamber.

Another alternative is that a vacuum source may be used instead of air blower to induce or draw warm air from the filament forming area into the air chamber. The warm air is drawn through the screens and into the air housing 110 by the vacuum source. The warm air travels from the air housing 110 into one of the air plenums 130, 132 and into air intake tubes by the vacuum source.

The cooling apparatus may be used with any number of turning vanes in the intersection of the air housing and the air plenums. On the other hand, it is also contemplated that turning vanes are not required and may not be used.

Another alternative is that the cooling apparatus may be used to provide uniform air flow to the filament forming area beneath a bushing without the use of a manifold and cooling fin assembly.

The artisan also will appreciate that the pressure gauge may be located in the header instead of one of the individual air tubes.

We claim:

1. A method of cooling a glass filament forming area beneath a bushing in a filament forming apparatus, the bushing having two laterally spaced apart banks of tips from which filaments are attenuated the method comprising the steps of:

disposing adjacent the filament forming area an air housing having top walls and first and second side walls defining therebetween an air chamber, each of said side walls being oriented at an angle with respect to a vertical plane, said air housing positioned between the banks of tips, said first side wall including an opening, said opening facing the filament forming area beneath a first bank of tips; and inducing a first flow of air between the filament forming area beneath said first bank of tips and said air chamber to cool the filament forming area beneath said first bank of tips, said first flow of air having sufficient velocity to force air between the banks of tips into the filament forming area beneath said first bank of tips.

2. The method of claim 1, wherein said step of inducing a first flow of air includes inducing a flow of air from said air chamber to the filament forming area beneath said first bank of tips with a pump.

3. The method of claim 1, wherein said step of disposing an air housing includes mounting a screen in said opening, and said step of inducing a first flow of air includes inducing a flow of air through said screen.

4. The method of claim 1, wherein said step of disposing an air housing includes operatively coupling an air plenum to an end of said air housing, wherein said air flows between said air plenum and said air housing.

5. The method of claim 1, further comprising the steps of:
disposing a tube in said air housing; and
supplying a fluid to said tube, wherein said fluid can be supplied to control the temperature of the air in said air chamber.

6. The method of claim 1, wherein said second side wall includes an opening, said second side wall opening facing the filament forming area beneath a second bank of tips, the method further comprising:
inducing a second flow of air between the filament forming area beneath said second bank of tips and said air chamber to cool the filament forming area beneath said second bank of tips, said second flow of air having sufficient velocity to force air between the banks of tips into the filament forming area beneath said second bank of tips.

7. A method of cooling a glass filament forming area beneath a bushing in a filament forming apparatus, the bushing having two laterally spaced apart banks of tips from which filaments are attenuated, the method comprising the steps of:

disposing adjacent the filament forming area an air housing having top walls and first and second side walls defining therebetween an air chamber, said air housing positioned between the banks of tips, said first side wall including an opening, said opening facing the filament forming area beneath a first bank of tips; and inducing a first flow of air between the filament forming area beneath said first bank of tips and said a chamber to cool the filament forming area beneath said first bank of tips, said first flow of air having sufficient velocity to force air between the banks of tips into the filament forming area beneath said first bank of tips.

8. The method of claim 7, wherein said step of inducing a first flow of air includes inducing a flow of air from said air chamber to the filament forming area beneath said first bank of tips with a pump.

9. The method of claim 7, wherein said step of disposing an air housing includes mounting a screen in said opening, and said step of inducing a first flow of air includes inducing a flow of air through said screen.

10. The method of claim 7, wherein said step of disposing an air housing includes operatively coupling an air plenum to an end of said air housing wherein said air flows between said air plenum and said air housing.

11. The method of claim 7, further comprising the steps of:
disposing a tube in said air housing; and
supplying a fluid to said tube, wherein said fluid can be supplied to control the temperature of the air in said air chamber.

12. The method of claim 7, wherein said second side wall includes an opening, said second side wall opening facing the filament forming area beneath a second bank of tips, the method further comprising:
inducing a second flow of air between the filament forming area beneath said second bank of tips and said air chamber to cool the filament forming area beneath said second bank of tips, said second flow of air having sufficient velocity to force air between the banks of tips into the filament forming area beneath said second bank of tips.

\* \* \* \* \*